US008499624B1

(12) United States Patent
Simpson et al.

(10) Patent No.: US 8,499,624 B1
(45) Date of Patent: Aug. 6, 2013

(54) METHOD TO DETERMINE PERFORMANCE CHARACTERISTIC OF AN ENGINE EXHAUST SYSTEM

(75) Inventors: Kenneth M Simpson, Swartz Creek, MI (US); James W. Jeffers, Linden, MI (US); Mike W. French, Auburn Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/397,947

(22) Filed: Feb. 16, 2012

(51) Int. Cl.
*G01M 15/00* (2006.01)

(52) U.S. Cl.
USPC .......................................................... 73/114.72

(58) Field of Classification Search
USPC .......................................... 73/114.38, 114.72
See application file for complete search history.

(56) References Cited

U.S. PATENT DOCUMENTS

| | | | | |
|---|---|---|---|---|
| 5,335,539 | A | 8/1994 | Sweppy et al. | |
| 6,148,808 | A | 11/2000 | Kainz | |
| 6,382,198 | B1 | 5/2002 | Smith et al. | |
| 6,481,273 | B2 | 11/2002 | Maloney | |
| 7,926,330 | B2 * | 4/2011 | Huang et al. | 73/114.38 |

OTHER PUBLICATIONS

SAE International, Individual Cylinder Fuel Control for Imbalance Diagnosis; James C. Smith, Charles W. Schulte, David D. Cabush; 2010-01-0157, Published Apr. 12, 2010.

* cited by examiner

*Primary Examiner* — Freddie Kirkland, III
(74) *Attorney, Agent, or Firm* — Lawrence D. Hazelton

(57) ABSTRACT

A method to determine a performance characteristic of an exhaust system of an engine, where the exhaust system includes an exhaust gas sensor that outputs an exhaust gas signal. A combustion event in a cylinder is fueled at an air-fuel ratio selected to produce exhaust gas that is expected to be distinguishable by the exhaust gas sensor from exhaust gas produced by other combustion events, and used to determine the performance characteristic. The performance characteristic may be an exhaust gas transport time of the exhaust system, a sensitivity characteristic of the exhaust gas sensor, or a fueling correction value necessary to restore fueling to, for example, stoichiometry. Such a method is useful to detect physical changes in the exhaust system such as relocating the exhaust gas sensor, or detect if the exhaust gas sensor is damaged or not operating properly.

12 Claims, 3 Drawing Sheets

METHOD TO DETERMINE PERFORMANCE CHARACTERISTIC OF AN ENGINE EXHAUST SYSTEM

TECHNICAL FIELD OF INVENTION

This disclosure generally relates to a method to determine a performance characteristic of an exhaust system for an engine, and more particularly relates to a deliberately miss-fueling a combustion event to cause an exhaust gas composition transient in order to measure the performance characteristic.

BACKGROUND OF INVENTION

It is known to control air/fuel ratios of individual cylinders of a multiple cylinder engine using a single exhaust gas sensor such as an oxygen sensor. An example of such a system is the Individual Cylinder Fuel Control (ICFC) marketed by Delphi Corporation headquartered in Troy, Mich. It has been discovered that it would be advantageous for such a system to detect certain performance characteristics such as changes to the sensitivity of an oxygen sensor to variations in exhaust gas composition, or time shifts of an oxygen sensor output signal caused by, for example, changes to the physical location of the exhaust oxygen sensor relative to each cylinder of the engine. Furthermore, a suggested interpretation of the California Air Resources Board (CARB) regulations is that a sensor used for an input signal to another diagnostic or emission control strategy must be monitored or verified to be sufficient for that use.

SUMMARY OF THE INVENTION

In accordance with one embodiment, a method to determine a performance characteristic of an exhaust system of an engine is provided. The exhaust system includes an exhaust gas sensor configured to output an exhaust gas signal. The method includes the step of fueling a combustion event in a cylinder at an air-fuel ratio selected to produce exhaust gas that is expected to be distinguishable by the exhaust gas sensor from exhaust gas produced by other combustion events. The method also includes the step of detecting exhaust gas in the exhaust system produced by the combustion event using the exhaust gas sensor. The method also includes the step of determining the performance characteristic based on an exhaust gas signal indicative of the combustion event. The performance characteristic may be one or more of an exhaust gas transport time of the exhaust system, a sensitivity characteristic of the exhaust gas sensor, and a fueling correction value.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Described herein is a way for an engine control system to monitor performance characteristics of an internal combustion engine. In particular, as will be explained in further detail below, is a way to determine if an exhaust gas sensor such as an oxygen sensor is exhibiting low sensitivity and so may be damaged, or is exhibiting evidence that the exhaust gas sensor has been relocated by, for example, the installation of a different exhaust manifold. Furthermore, it will be apparent that the technique described below is advantageous over techniques that determine frequency response characteristics because those techniques rely on operating the engine at a particular speed. In contrast, the technique set forth herein can be performed at any engine speed, and so the performance characteristics can be monitored or determined at any engine speed, for example while the vehicle with the engine is being driven.

Figure 1:
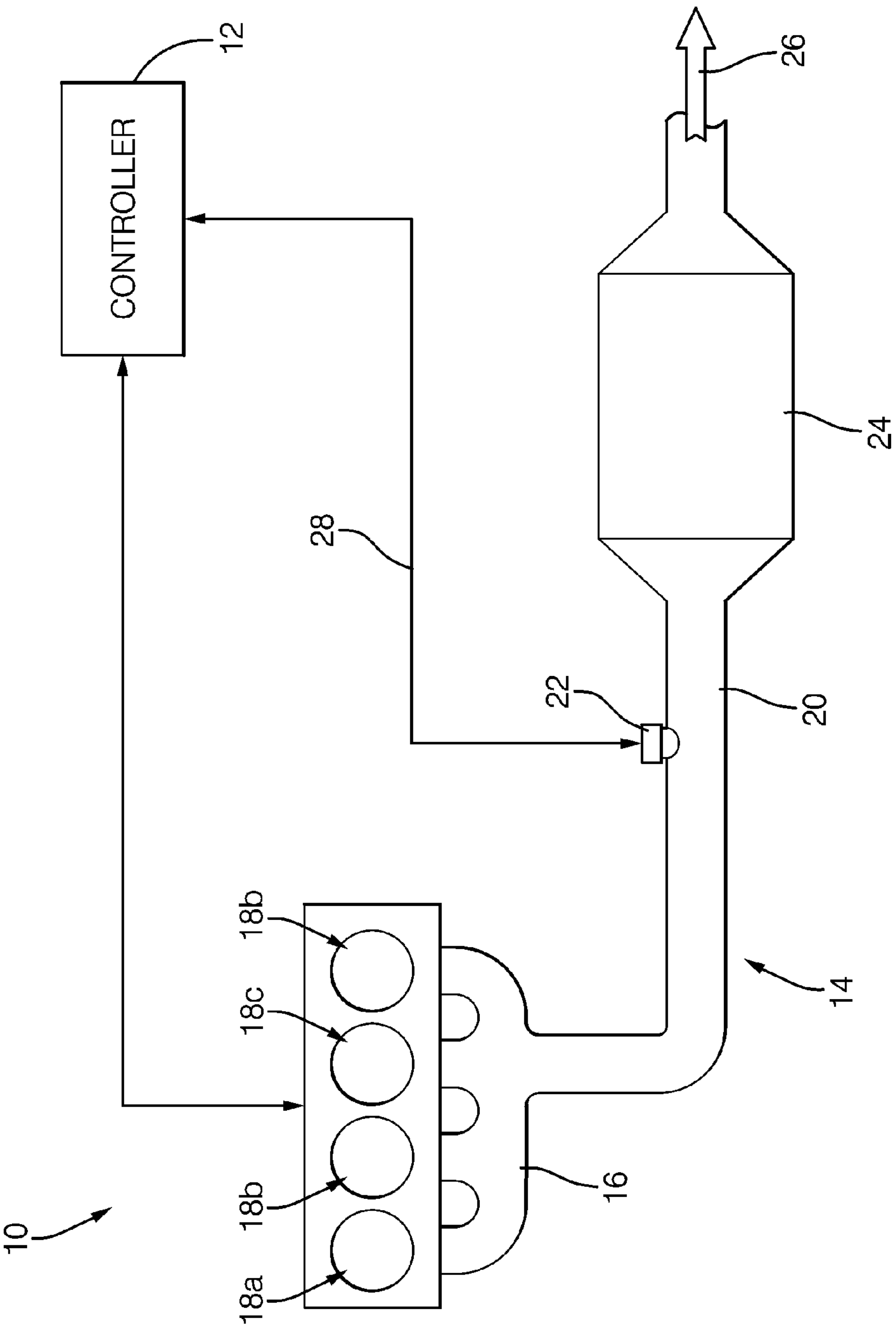
FIG. 1 is a diagram of an engine equipped with an exhaust system in accordance with one embodiment.

FIG. 1 illustrates a non-limiting example of an engine 10. The engine 10 is generally depicted as a four-cylinder, internal combustion type engine, however it will be apparent that the teachings set forth below are applicable to engines having any number of cylinders including one cylinder. The engine may be a spark-ignition or compression-ignition type engine. The engine 10 may be connected to a controller 12 configured to independently control how much air and or fuel is delivered to each cylinder for each combustion event. As such, the air/fuel ratio of any combustion event is individually controllable. By way of example and not limitation, the controller 12 may operate the engine 10 so that all the cylinders are being charged with a stoichiometric air/fuel ratio. Then one cylinder may receive a one-time air/fuel charge that is not stoichiometric, e.g. is rich or lean, followed by all the subsequent cylinder charges for all cylinders again being stoichiometric. This transient miss-fueling would produce a packet or pulse of exhaust gas that would likely include more than normal unburned fuel if the charge was rich, or more than normal oxygen if the charge was lean.

The controller 12 may include a processor such as a microprocessor or other control circuitry as should be evident to those in the art. The controller 12 may include memory, including non-volatile memory, such as electrically erasable programmable read-only memory (EEPROM) for storing one or more routines, thresholds and captured data. The one or more routines may be executed by the processor to perform steps for determining if signals received by the controller 12 for determining the performance characteristic as described herein.

The engine 10 is generally equipped with an exhaust system 14 that may include a manifold portion 16 configured to route exhaust gas from individual cylinders 18*a-d* (not specifically illustrated) into an exhaust pipe 20. The exhaust system 14 may include an exhaust gas sensor 22 configured to output an exhaust gas signal. By way of example and not limitation, the exhaust gas sensor 22 may be an oxygen sensor, for example a switching type or a linear type also known as a wide-range air/fuel type. Alternatively, the exhaust gas sensor 22 may be based on some other technology such as infrared or ultraviolet light transmission loss, temperature, dielectric constant, or any other sensing technology that is able to detect variations in exhaust gas characteristics that are indicative of air/fuel ratio.

Figure 2:
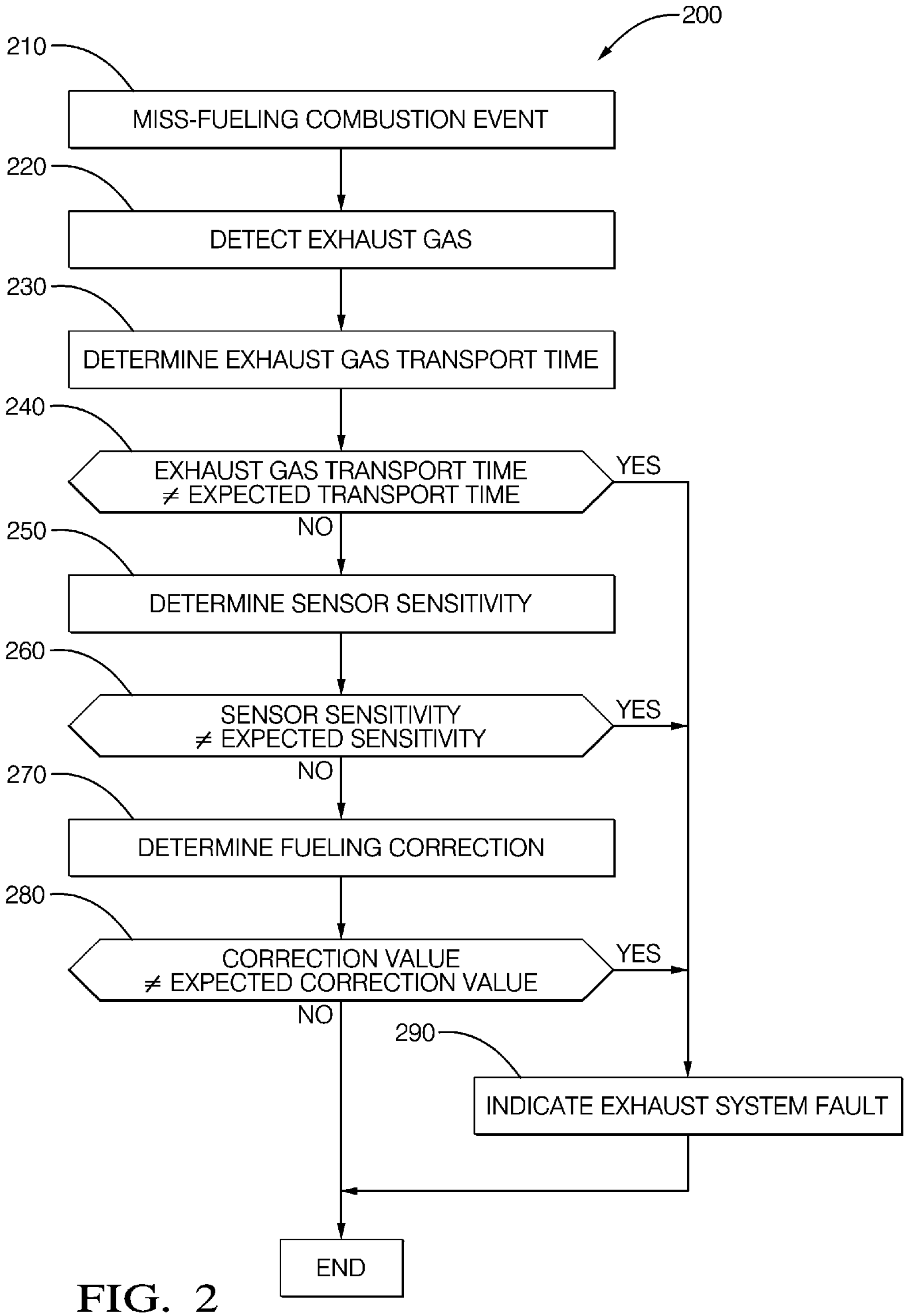
FIG. 2 is a flowchart of a method to detect a performance characteristic of the exhaust system of FIG. 1 in accordance with one embodiment.

FIG. 2 illustrates a non-limiting example of a method 200 to determine a performance characteristic of the exhaust system 14 of the engine 10. It will be appreciated that the steps may be reordered, and some of the steps deleted, and the method would still be effective to determine a performance characteristic.

Figure 3:
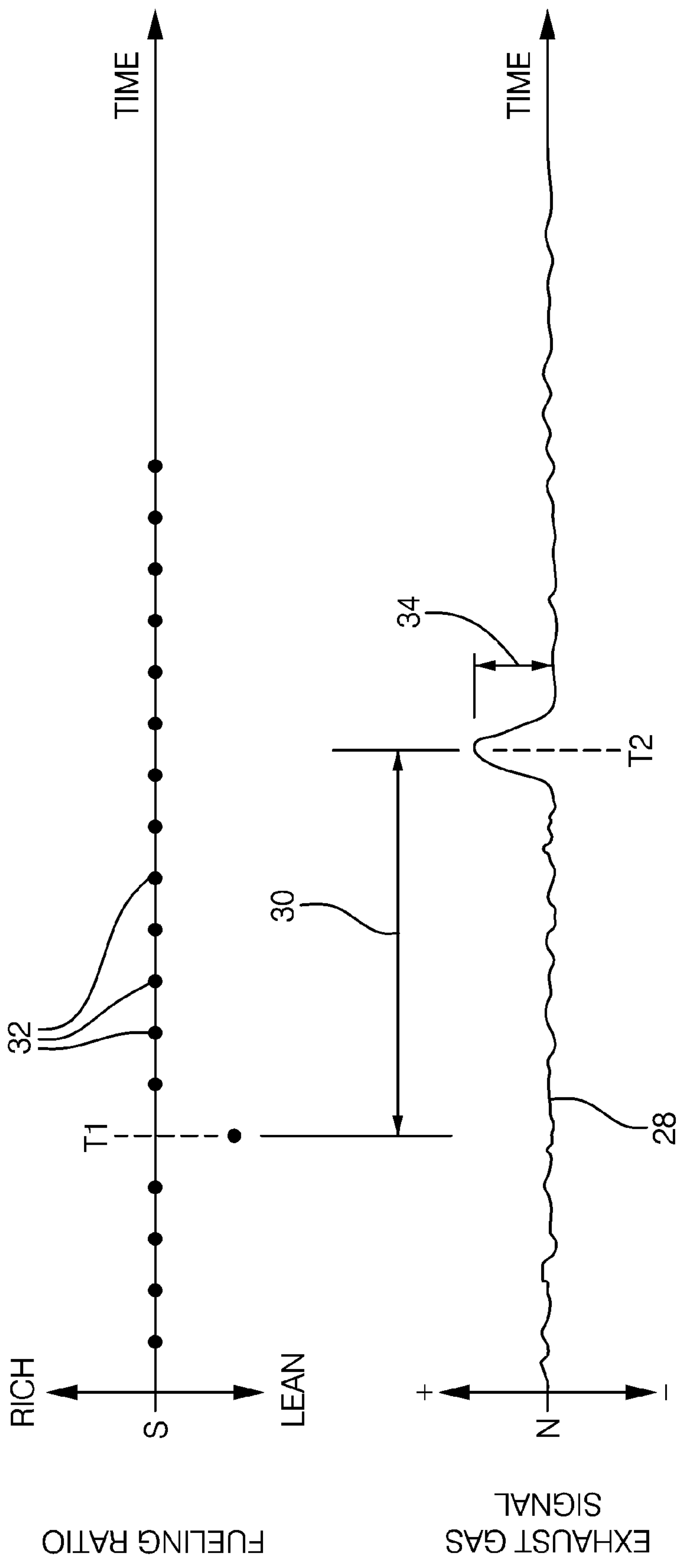
FIG. 3 is a graph of combustion events and the resulting exhaust gas signal used to detect a performance characteristic of the exhaust system of FIG. 1 in accordance with one embodiment.

Step 210, MISS-FUELING COMBUSTION EVENT, may include fueling a combustion event in a cylinder (any one or more of cylinders 18*a-d*) at an air-fuel ratio selected to produce exhaust gas that is expected to be distinguishable by the exhaust gas sensor 22 from exhaust gas produced by other combustion events. For example, FIG. 3 illustrates an instance where the engine 10 may be operating with most combustion events 32 in the cylinders 18*a-d* being stoichiometric, labeled S on the Fueling Ratio graph, but with one of combustion events 32 being non-stoichiometric as described above. In this example, at time T1, a combustion event is fueled leaner than stoichiometric as indicated by the data point being below the line for stoichiometry.

Alternatively, in order to maximize the efficiency of a catalytic converter 24 (FIG. 1) and thereby minimize undesirable constituents in tail-pipe emissions 26, it may be preferable to over-fuel (not shown in FIG. 3) by a rich factor a first combustion event in a first cylinder 18*a* of the engine 10, and under-fuel by a lean factor a second combustion event in a second cylinder 18*b* of the engine 10. The rich factor and the lean factor are preferably selected such that when exhaust gas from the first combustion event and the second combustion event are combined, the mixture is substantially stoichiometric, and so catalytic converter efficiency can be maximized. This example could be illustrated on the Fueling Ratio graph of FIG. 3 as a Rich biased data point preceding the Lean data point at T1.

By way of a specific example and not limitation, if a stoichiometric air/fuel ratio is 14.7:1, an exemplary rich factor may be +10% so that the air/fuel ratio when over-fueling is be about 13.36:1, and an exemplary lean factor may be −10% so that the air/fuel ratio is about 16.17:1. By this, there should be sufficient oxygen in the exhaust gas from the second combustion event to consume the excess fuel in the exhaust gas from the first combustion event. In order to have the excess oxygen and excess fuel arrive at the catalytic converter 24 as close together in time as possible, it may be preferable that there are no other combustion events between the first combustion event and the second combustion event, i.e. that the first and second combustion events are temporally adjacent combustion events for the engine 10.

Step 220, DETECT EXHAUST GAS, may include monitoring an exhaust gas signal 28 in order to detect exhaust gas in the exhaust system 14 produced by the combustion event using the exhaust gas sensor 22. By way of example and not limitation, the controller 12 may receive the exhaust gas signal 28 and analyze the exhaust gas signal 28 in order to detect a deviation or perturbation in the exhaust gas signal such as a peak value, or a slope of the exhaust gas signal 28, or a value exceeding some threshold. For example, the controller 12 may include an analog to digital converter (DAC) that captures periodic samples of the exhaust gas signal 28 By analyzing the exhaust gas signal 28 by one or more of the criteria below, the performance characteristic can be determined based on an exhaust gas signal indicative of the combustion event.

FIG. 3 illustrates an example of an Exhaust Gas Signal 28 for the exhaust system 14 where the lean combustion event at time T1 causes a perturbation in the Exhaust gas signal 28 at time T2 to deviate from the normal or nominal value indicated by N. In this instance, by way of example and not limitation, time T2 is aligned with a peak of the exhaust gas signal 28. However, as suggested above, other signal characteristics could be used to determine time T2.

Step 230, DETERMINE EXHAUST GAS TRANSPORT TIME, may include determining an exhaust gas transport time 30 based a time difference or time interval between T1 and T2. The exhaust gas transport time 30 is generally indicative of the time it takes for exhaust gas produced a particular combustion event (e.g. the lean combustion event at time T1) to propagate from a particular cylinder (18*a-d*) to the exhaust sensor 22. Knowing the exhaust gas transport time 30 is advantageous for engine systems using Individual Cylinder Fuel Control (ICFC) so that each cylinder can be individually controlled to an optimum fuel ratio.

Step 240, EXHAUST GAS TRANSPORT TIME≠EXPECTED TRANSPORT TIME, may include determining if the exhaust gas transport time 30 differs from an expected transport time by an amount greater than a time threshold. If the change is less than the threshold, i.e. the exhaust gas transport time and the expected transport are approximately equal (e.g. within +/−5%), the result of the test is NO, and so the method 200 proceeds to step 250. If YES, then the method 200 proceeds to step 290. An instance when the exhaust gas transport time 30 does differ from an expected transport time by an amount greater than the time threshold (i.e. not equal) may occur if the physical distance between the exhaust sensor 22 and a particular cylinder (18*a-d*) changes because, for example, the manifold portion 16 was replaced with an incorrect replacement part or a modified part.

Step 250, DETERMINE SENSOR SENSITIVITY, may include determining, detecting or measuring a sensitivity characteristic of the exhaust gas sensor. For example, a sensitivity characteristic may be based on a value change 34 or perturbation of the amplitude of the exhaust gas signal in response to the combustion event, illustrated in FIG. 3 and a difference between the nominal value N and a peak value of the exhaust gas signal 28 at time T2.

Step 260, SENSOR SENSITIVITY≠EXPECTED SENSITIVITY, may include determining a change of the performance characteristic is indicated if the value change 34 of the exhaust gas signal differs from an expected signal change by an amount greater than a signal change threshold. If the value change 34 is as expected (e.g. NO, it is about equal), then the method 200 proceeds to step 270. If YES because there is a substantial difference (e.g. greater than +/−10%), then the method 200 proceeds to step 290. A possible cause of the exhaust gas signal 28 differing from an expected signal change by an amount greater than a signal change threshold may be contamination of damage to the exhaust gas sensor 22.

Step 270, DETERMINE FUELING CORRECTION VALUE may include periodically repeating step 210 while holding all other combustion event fuel ratios fixed, and allowing a close loop correction algorithm in the controller 12 to determine a fueling correction value (not shown) necessary to eliminate the signal perturbation at time T2. Once a correction value is determined that eliminates the signal perturbation at time T2, the method 200 proceeds to step 280.

Step 280, CORRECTION VALUE≠EXPECTED CORRECTION VALUE, may include comparing the determined correction value to an expected correction value. If they differ by an amount that is not greater that a correction value threshold (e.g. NO, they are approximately equal), then the method 200 is completed. If YES because the correction value differs from an expected correction value by greater than a correction threshold (e.g. greater than +/−10%), then the method proceeds to step 290. A potential cause for the correction value to differ from the expected correction value by greater that a correction threshold is from the expected is a fault in the ignition system that does not properly ignite the air/fuel mixture in the cylinder, or an improperly operating exhaust or inlet valve (not shown) in the engine 10

Step 290, INDICATE EXHAUST SYSTEM FAULT, may include determining an exhaust system fault based on the exhaust gas signal and an expected performance characteristic as described in steps 240, 260, and 280 above. An exhaust system fault may be indicated by illuminating a SERVICE ENGINE SOON indicator on the vehicle's instrument panel, or may cause the controller 12 to initiate further actions to reduce the potential for excessive emissions.

In general, the method described herein is directed toward evaluating the fuel control system's ability to control a single cylinder's air to fuel ratio and the exhaust sensor's capability of actually detecting individual cylinder events base on an exhaust gas signature. In contrast, prior art has suggested evaluating a frequency response of an exhaust sensor by varying a base fuel pulse command at a perturbation frequency. The method describe herein does not command a frequency-based offset, but an event based fueling perturbation to a particular cylinder.

By way of further exemplary explanation and not limitation, described herein is a detecting an error in the determination of an exhaust gas signal (exhaust transport time and/or sensitivity) of an exhaust system 14 for the engine 10. the method includes a) inducing a fuel disturbance on a single cylinder (or multiple cylinders) of high enough amplitude such that the disturbance can be measured by the exhaust gas sensor, b) introducing an offsetting fuel disturbance (or set of disturbances) within specific cylinders on the engine based on pre-calculated values such that the mixture of exhaust from the initial and offsetting disturbances should be substantially stoichiometric, and c) monitoring of the individual cylinder closed-loop correction factors such that substantial changes in the correction factor amplitude provide an indication of improper pre-calculation of the exhaust transport time or sensitivity.

Accordingly, an exhaust system 14, a controller 12 for the exhaust system 14 and a method 200 to determine a performance characteristic of an exhaust system of an engine is provided.

While this invention has been described in terms of the preferred embodiments thereof, it is not intended to be so limited, but rather only to the extent set forth in the claims that follow.

We claim:

1. A method to determine a performance characteristic of an exhaust system of an engine, said system comprising an exhaust gas sensor configured to output an exhaust gas signal, said method comprising:

fueling a combustion event in a cylinder at an air-fuel ratio selected to produce exhaust gas that is expected to be distinguishable by the exhaust gas sensor from exhaust gas produced by other combustion events, wherein the step of fueling a combustion event includes over-fueling by a rich factor a first combustion event in a first cylinder of the engine; and under-fueling by a lean factor a second combustion event in a second cylinder of the engine, wherein the rich factor and the lean factor are selected such that when exhaust gas from the first combustion event and the second combustion event are combined, the mixture is substantially stoichiometric;

detecting exhaust gas in the exhaust system produced by the combustion event using the exhaust gas sensor; and determining the performance characteristic based on an exhaust gas signal indicative of the combustion event.

2. The method in accordance with claim 1, wherein said performance characteristic is at least one of an exhaust gas transport time of the exhaust system, and a sensitivity characteristic of the exhaust gas sensor.

3. The method in accordance with claim 1, wherein said method further comprises determining an exhaust system fault based on the exhaust gas signal and an expected performance characteristic.

4. The method in accordance with claim 1, wherein the step of determining the performance characteristic includes determining an exhaust gas transport time of the exhaust system.

5. The method in accordance with claim 4, wherein said exhaust gas transport time is determined based on a time interval between the combustion event and when the exhaust gas from the combustion event is indicated by the exhaust gas signal.

6. The method in accordance with claim 5, wherein a change of the performance characteristic is indicated if the exhaust gas transport time differs from an expected transport time by an amount greater than a time threshold.

7. The method in accordance with claim 1, wherein the step of determining the performance characteristic includes determining a sensitivity characteristic of the exhaust gas sensor.

8. The method in accordance with claim 7, wherein said sensitivity characteristic is determined based on a value change of the exhaust gas signal in response to the combustion event.

9. The method in accordance with claim 8, wherein a change of the performance characteristic is indicated if the value change of the exhaust gas signal differs from an expected signal change by an amount greater than a signal change threshold.

10. The method in accordance with claim 1, wherein the step of determining the performance characteristic includes determining an exhaust gas transport time of the exhaust system and determining a sensitivity characteristic of the exhaust gas sensor.

11. The method in accordance with claim 1, wherein there are no other combustion events between the first combustion event and the second combustion event.

12. The method in accordance with claim 1, wherein said method further comprises determining a fueling correction value for the cylinder based on the exhaust gas signal.

* * * * *